(12) United States Patent
Inoue et al.

(10) Patent No.: US 7,843,107 B2
(45) Date of Patent: Nov. 30, 2010

(54) DYNAMOELECTRIC MACHINE

(75) Inventors: Masaya Inoue, Tokyo (JP); Kanji Shinkawa, Tokyo (JP); Masao Morita, Tokyo (JP); Haruyuki Kometani, Tokyo (JP); Toshiyuki Yoshizawa, Tokyo (JP); Moriyuki Hazeyama, Tokyo (JP); Keiichi Ito, Tokyo (JP); Takeshi Mori, Tokyo (JP); Hiroyuki Akita, Tokyo (JP); Yoshinori Miyamoto, Tokyo (JP); Shinji Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/444,975

(22) PCT Filed: Mar. 9, 2007

(86) PCT No.: PCT/JP2007/054640

§ 371 (c)(1),
(2), (4) Date: Apr. 9, 2009

(87) PCT Pub. No.: WO2008/044347

PCT Pub. Date: Apr. 17, 2008

(65) Prior Publication Data

US 2010/0096941 A1    Apr. 22, 2010

(30) Foreign Application Priority Data

Oct. 10, 2006   (JP) .................... 2006-276346

(51) Int. Cl.
*H02K 1/22*   (2006.01)
*H02K 21/12*  (2006.01)

(52) U.S. Cl. ............ 310/263; 310/156.66; 310/156.67; 310/156.71; 310/156.72

(58) Field of Classification Search .............. 310/156.8, 310/156.66–156.69, 156.71–156.73, 263
See application file for complete search history.

(56) References Cited

U.S. PATENT DOCUMENTS

| 4,959,577 | A | 9/1990 | Radomski |
| 5,543,676 | A | 8/1996 | York et al. |
| 5,825,116 | A | 10/1998 | Ishikawa |
| 6,307,297 | B1 * | 10/2001 | Bramson et al. ............ 310/263 |
| 6,555,944 | B1 | 4/2003 | York |
| 2004/0080235 | A1 | 4/2004 | York |
| 2008/0315701 | A1 | 12/2008 | Inoue et al. |
| 2009/0009021 | A1 | 1/2009 | Shinkawa et al. |
| 2009/0066175 | A1 | 3/2009 | Morita et al. |

FOREIGN PATENT DOCUMENTS

| JP | 9 131030 | 5/1997 |
| JP | 2002 199678 | 7/2002 |
| JP | 2004 153994 | 5/2004 |
| WO | 99 08365 | 2/1999 |

* cited by examiner

*Primary Examiner*—Quyen Leung
*Assistant Examiner*—Jose A Gonzalez Quinones
(74) *Attorney, Agent, or Firm*—Oblon, Spivak, McClelland, Maier & Neustadt, L.L.P.

(57) ABSTRACT

A dynamoelectric machine including first and second permanent magnets held by first and second magnet seats on first and second yoke portions so as to face inner circumferential surfaces of tip end portions of first and second claw-shaped magnetic pole portions. The first and second permanent magnets are magnetically oriented in a reverse direction to orientation of a magnetic field that the field coil produces. The dynamoelectric machine enables permanent magnet holding reliability to be increased, induced voltage during no-load de-energization to be suppressed, and thermal demagnetization of magnets due to high-frequency magnetic fields that are induced by stator slots to be avoided.

13 Claims, 10 Drawing Sheets

| Alternator rotational frequency (rpm) | Conventional device generated power (A) | Present invention generated power (A) |
|---|---|---|
| 1300 | 34 | 60 |
| 2000 | 113 | 130 |
| 5000 | 160 | 165 |

DYNAMOELECTRIC MACHINE

TECHNICAL FIELD

The present invention relates to a dynamoelectric machine such as an automotive alternator, etc., and particularly relates to a Lundell rotor structure to which permanent magnets are mounted.

BACKGROUND ART

Automotive alternators that use Lundell rotors have been used in automobiles for decades. Loads from electrical equipment that is mounted onto automobiles due to environmental issues have been increasing rapidly in recent years, and further increases in generated power are being sought from Lundell rotors.

If attempts are made to answer these demands within the scope of conventional design, the alternators are invariably increased in size. Increases in alternator size are undesirable since the weight of and space occupied by such alternators is increased. Increases in alternator size are also known to give rise to new problems such as leading to increased rotor inertia, and engine speed fluctuations and alternator inertial torque interacting and leading to belt vibration and slippage.

Consequently, there is demand to increase alternator capacity while maintaining alternator main body size in its present state.

Conventionally, means of disposing permanent magnets between claw-shaped magnetic poles that face each other in a Lundell rotor have been adopted in order to solve such problems (see Patent Literature 1 and 2, for example).

In addition, examples of magnet mounting methods include: methods in which U-shaped magnets are held on claw-shaped magnetic poles by being fitted onto claw tips of the claw-shaped magnetic poles (see Patent Literature 3, for example), or methods in which a ring-shaped magnet is disposed on an outer circumferential portion of a cylindrical field coil that has been wound onto a boss portion of a rotor core, and the magnet is held by claw-shaped magnetic poles (see Patent Literature 4, for example).

Thus, various methods for holding permanent magnets have been proposed in conventional automotive alternators, but for these permanent magnet holding methods to be of practical use, it is necessary to: (1) increase permanent magnet holding reliability; (2) suppress induced voltages during no-load de-energization; and (3) avoid thermal demagnetization of the magnets by high-frequency magnetic fields that are induced by stator slots.

Each of these factors will now be explained.

(1) Permanent Magnet Holding Strength

In automotive alternators, rotors rotate at high speeds in a vicinity of up to 18,000 to 20,000 rpm when driven by torque that is transmitted from an engine by means of belts and pulleys. Because of this, even if small magnets that weight only a few grams per pole are installed, extremely large centrifugal forces that exceed several tens of kilogram force act on the magnets.

Conventional magnet holding methods have attempted to hold the centrifugal forces that act on the magnets using the claw-shaped magnetic poles themselves. In these magnet holding methods, it is necessary to finish surfaces to be joined of both the magnets and the claw portions with extremely high precision so as to place the two in a state of surface contact. In other words, if the two are placed in point contact, local stresses may be concentrated on the magnets, and the magnets may be damaged. Because raising magnet processing precision is difficult in mass-produced products, it is also possible to consider means for ensuring external shape precision of the magnets using SUS plates or resin molds instead, but these lead to enormous costs.

To facilitate installation of field coils, pole cores are divided axially into two combining sections, and it is also necessary to increase combining precision. Realistically, ensuring such parts precision increases costs significantly during mass production of rotors.

In addition, even if static shape precision is adapted in this manner, magnet holding in automotive alternators is still difficult.

Specifically, since automotive alternators are disposed in engine compartments, they may be placed in high-temperature environments that are several tens of degrees above one hundred degrees Celsius, generating displacements of several tens of μm due to thermal expansion or contraction.

Large centrifugal forces also act on the claw-shaped magnetic poles even when not holding magnets, and the claw tip portions expand approximately 50 to 100 μm radially outward. Thus, the claw-shaped magnetic poles are displaced so as to flap with increases and decreases in engine rotational speed. Since the claw-shaped magnetic poles have a cantilever beam construction, displacement is greater at tip end portions, smaller at claw root end portions, and distances between adjacent claw-shaped magnetic poles also change.

Consequently, if attempts are made to hold the magnets using uniform surfaces despite the presence of such dynamic thermal and centrifugal displacements of the claw-shaped magnetic poles, a great deal of adaptation is required in the magnet holding construction.

Because magnet main bodies or covers that protect the magnets slide and abrade due to displacement of the claw-shaped magnetic poles, it is necessary to ensure reliability of strength for a long time.

Because of these facts, the current situation is such that much further adaptation is required in order to resist the centrifugal forces that act on the magnets and hold the magnets on the claw-shaped magnetic poles, and it is desirable that the magnets be held somewhere other than by the claw-shaped magnetic poles. Thus, in order to avoid the effects on magnet holding of relative displacement between the magnets and the claw-shaped magnetic poles, a conventional improved magnet holding construction has been proposed in which magnets that are magnetized radially are disposed on an outer circumferential side of a yoke portion on axial end portions of a Lundell pole core (see Patent Literature 5, for example).

(2) Induced Voltages During No-Load De-Energization

However, the above-mentioned conventional improved magnet holding construction has problems of induced voltage during no-load de-energization.

In the conventional improved magnet holding construction, because the magnets are disposed in a vicinity of a surface of the rotor, main magnetic flux or leakage flux from the magnets may have components that cannot be kept inside the rotor and that interlink directly with the stator.

The design is such that magnetic flux leakage levels generate magnetic flux approximately equivalent to one or two volts in an engine idling region at approximately 500 rpm. However, since automotive engines have a variable speed range of approximately 1:10, if, for example, the maximum engine speed is ten times that of idling, the one- or two-volt induced voltages from the magnets may exceed the system voltage of the vehicle and have adverse effects on other on-board equipment. To suppress this, a "reverse field" is required in which the field power source is polarized, and the field current flow is made to flow in reverse at high speeds to weaken the magnetic flux. One problem is that when the direction of flow of the current becomes bidirectional instead of unidirectional, a bidirectional circuit that incorporates an H-bridge is required instead of simple chopper control, increasing the number of components, and raising product costs. Furthermore, unlike a normal field, it is necessary to start this reverse field swiftly in response to increases in engine speed, but since a coil that has a high impedance of several hundred turns is used so as to be able to control the field using a small current of approximately several amperes, it is currently difficult to make the reverse field current flow instantaneously. If the number of field turns is reduced in order to avoid this, new problems arise such as the electric current value of the control power source itself also being increased, increasing control element capacity, and raising product costs.

(3) Demagnetization of Magnets Due to High-Frequency Magnetic Fields Induced by Stator Slots Having frequency components that are a product of the number of stator slots times rotational frequency per second, slot harmonic magnetic flux is a high-frequency magnetic field of two to three kilohertz. Under such conditions, if the magnets are held between the claw-shaped magnetic poles, or if U-shaped magnets are fitted onto and held by the tip ends of the claw-shaped magnetic poles, portions of the magnets or magnet holding metal fittings are exposed on the rotor surface facing the stator. These exposed magnets or magnet holding metal fittings are heated by induction by the high-frequency magnetic field due to slot harmonics. One problem is that if even a portion of a magnet is heated by induction and reaches a high temperature locally, heat will transfer to the entire magnet, and the magnet will be thermally demagnetized.

Portions of the magnets or magnet holding metal fittings are also exposed on the rotor surface facing the stator in the conventional improved magnet holding construction, making thermal demagnetization of the magnets similarly problematic.

Patent Literature 1: Japanese Patent Laid-Open No. SHO 61-85045 (Gazette)

Patent Literature 2: U.S. Pat. No. 4,959,577 (Specification)

Patent Literature 3: U.S. Pat. No. 5,543,676 (Specification)

Patent Literature 4: Japanese Patent Laid-Open No. 2002-136004 (Gazette)

Patent Literature 5: Japanese Patent Laid-Open No. 2004-153994 (Gazette)

DISCLOSURE OF THE INVENTION

Problem to be Solved by the Invention

Thus, in order to hold permanent magnets on a Lundell pole core, it is necessary to increase permanent magnet holding reliability, to suppress induced voltages during no-load de-energization, and to avoid thermal demagnetization of the magnets by high-frequency magnetic fields that are induced by stator slots.

However, since the conventional magnet holding constructions described above do not achieve sufficient countermeasures against these three problems, they do not make any practical contribution.

The present invention aims to solve the above problems and an object of the present invention is to provide a dynamoelectric machine that has the characteristics described below:

(1) Magnet holding is facilitated, and neither displacement of claw tips, which changes greatly relative to centrifugal forces in particular, nor relative displacement between the claws, affect magnet holding directly;

(2) In automotive alternators, which have wide temperature ranges, axial displacement among the claws relative to thermal expansion of the shaft and the rotor does not affect magnet holding directly;

(3) Induced voltages during no-load de-energization are less likely to occur even if magnet volume is increased considerably;

(4) Induction heating is less likely to occur due to encroaching stator slot harmonic magnetic flux; and (5) Increases in moment of inertia due to the addition of magnets and magnet holding materials are small, making inertia torque less likely to arise.

MEANS FOR SOLVING THE PROBLEM

In order to achieve the above object, according to one aspect of the present invention, there is provided a dynamoelectric machine including: a rotor having: a pole core having: a boss portion; a pair of yoke portions that are disposed so as to extend radially outward from two axial end edge portions of the boss portion; and a plurality of claw-shaped magnetic pole portions that are disposed so as to extend in an axial direction alternately from each of the pair of yoke portions, and that are arranged circumferentially so as to intermesh with each other, the pole core being fixed to a shaft that is inserted through a central axial position of the boss portion; and a field coil that is housed inside a space that is surrounded by the boss portion, the pair of yoke portions, and the plurality of claw-shaped magnetic pole portions; and a stator that is disposed so as to surround the rotor with a predetermined air gap interposed. A plurality of permanent magnets are held near the pair of yoke portions so as to face an inner circumferential surface of a tip end portion of each of the plurality of claw-shaped magnetic pole portions. In addition, each of the plurality of permanent magnets is magnetically oriented in a reverse direction to an orientation of a magnetic field that the field coil produces.

EFFECTS OF THE INVENTION

According to the present invention, the plurality of permanent magnets are held near yoke portions. Thus, because displacement of the plurality of claw-shaped magnetic poles that results from centrifugal forces and thermal expansion will not affect the permanent magnets, the occurrence of cracking or chipping of the permanent magnets that results from the displacement of the claw-shaped magnetic pole portions is suppressed, and holding of the permanent magnets is facilitated. Because each of the permanent magnets is positioned radially inside each of the claw-shaped magnetic pole portions, increases in moment of inertia that accompany disposition of the permanent magnets are reduced. In addition, centrifugal forces that act on the permanent magnets are also reduced, facilitating holding of the permanent magnets.

Because the plurality of permanent magnets are disposed so as to face the inner circumferential surface near the tip end portion of each of the plurality of claw-shaped magnetic pole portions, each of the permanent magnets is positioned radially inside each of the claw-shaped magnetic pole portions and is not heated by induction directly due to stator slot harmonics, enabling thermal demagnetization to be prevented.

In addition, because each of the plurality of permanent magnets is magnetically oriented in a reverse direction to the orientation of the magnetic field produced by the field coil, the magnetic field circuits formed by the permanent magnets are closed inside the rotor, suppressing the occurrence of induced voltages during no-load de-energization.

BEST MODE FOR CARRYING OUT THE INVENTION

Embodiment 1

Figure 1:
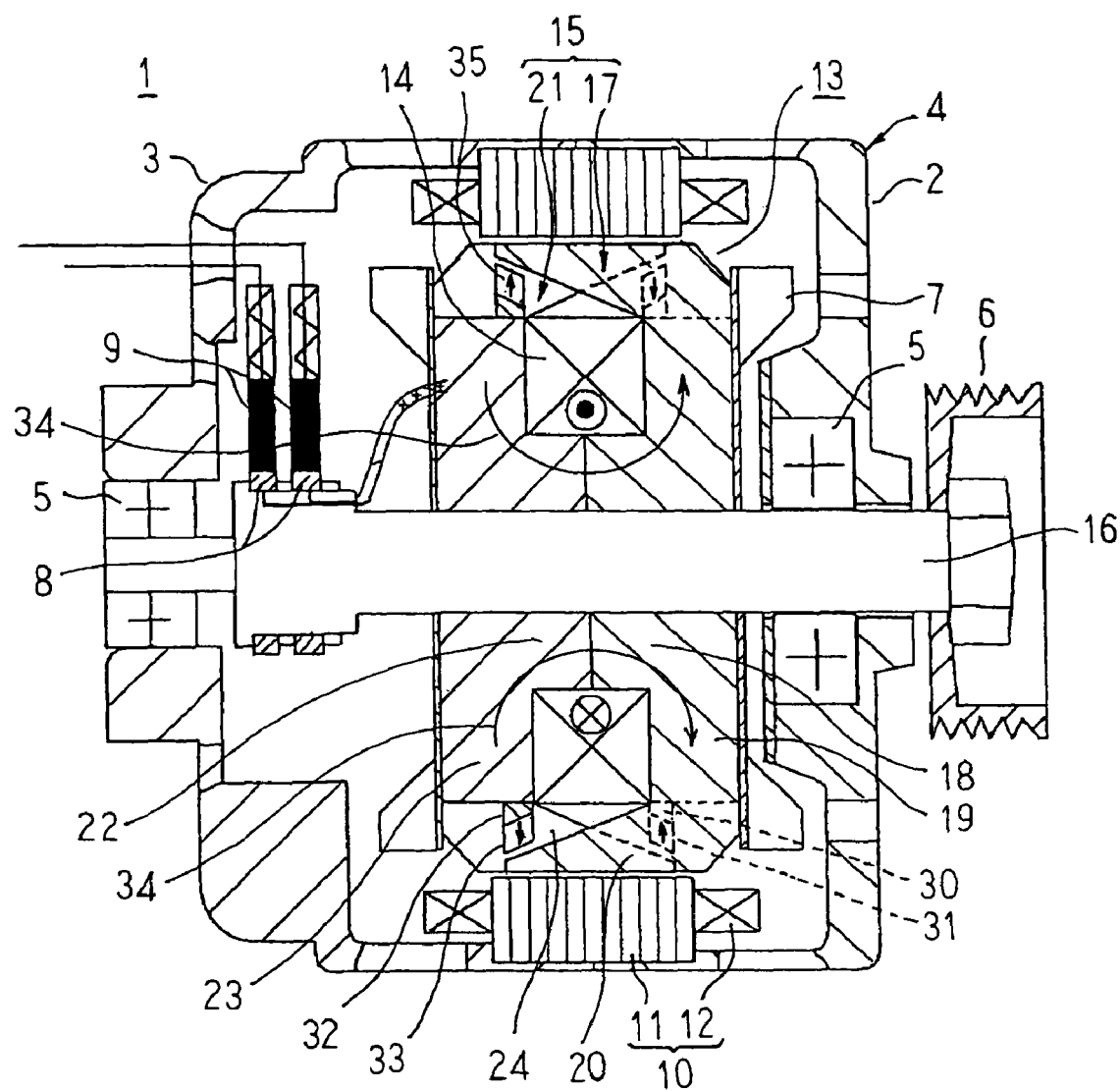
FIG. 1 is a cross section that schematically shows an automotive alternator according to Embodiment 1 of the present invention.
Figure 2:
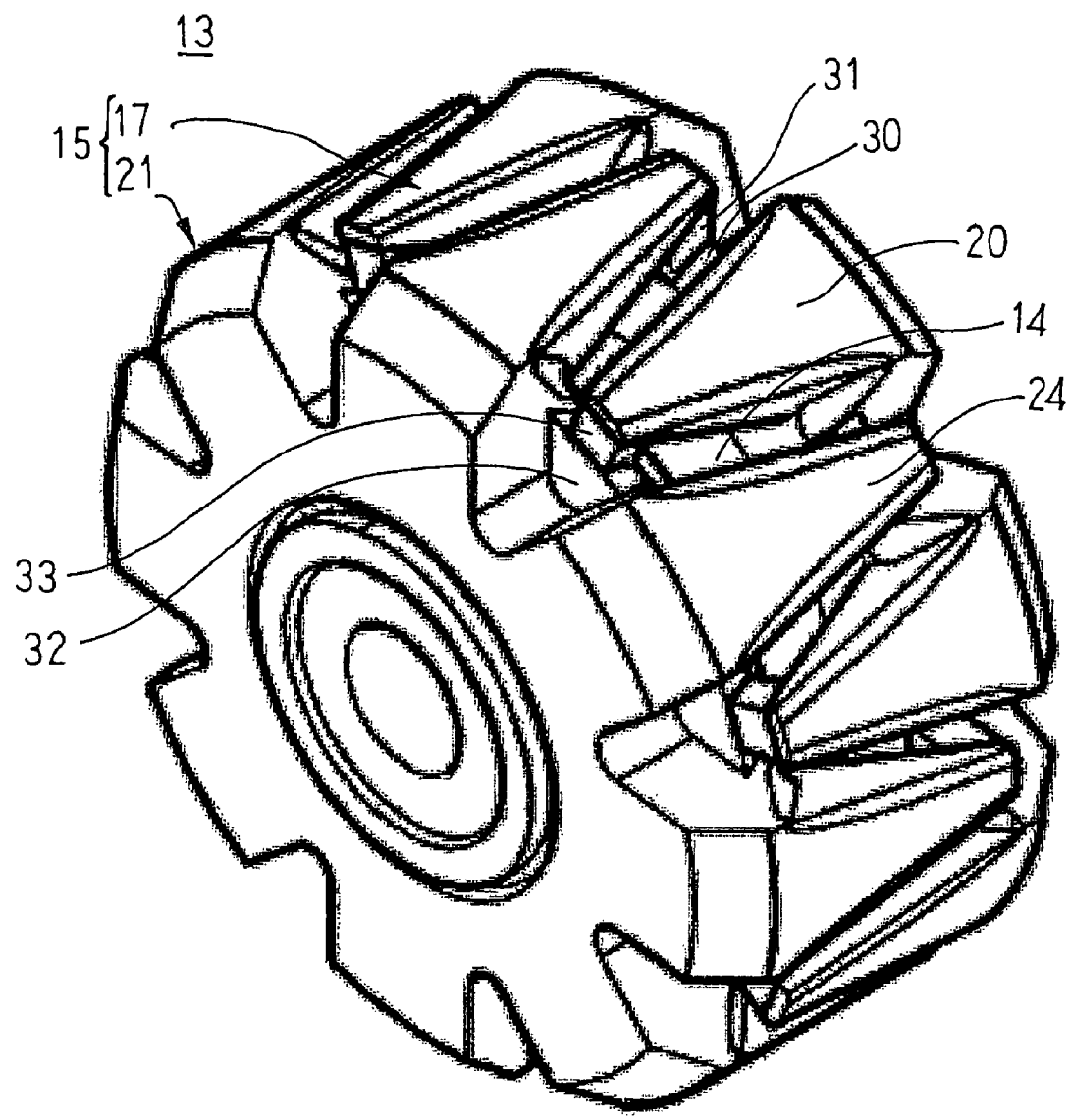
FIG. 2 is a perspective that shows a rotor that can be used in the automotive alternator according to Embodiment 1 of the present invention.
Figure 3:
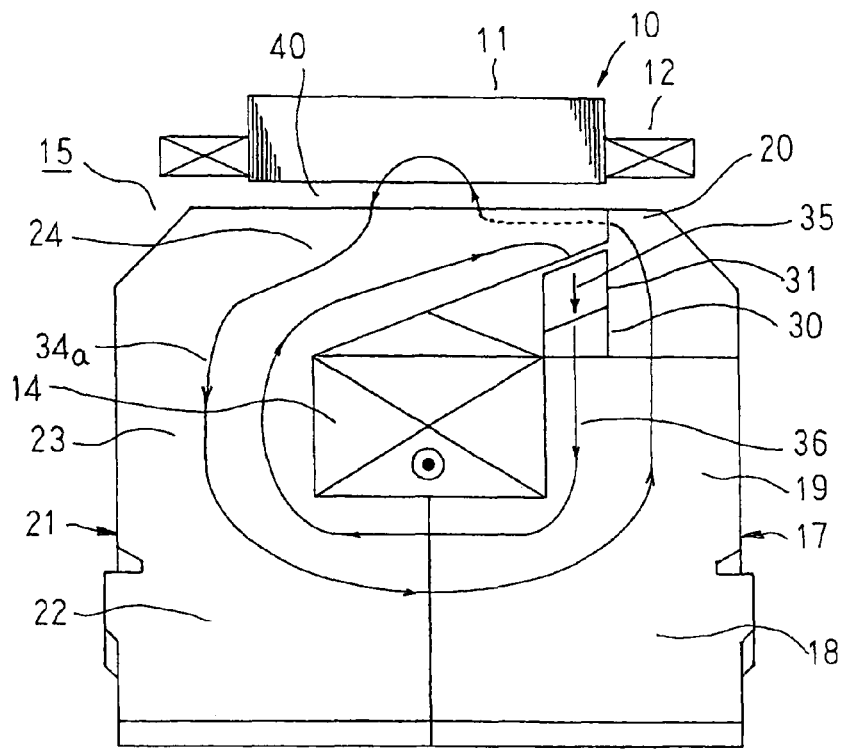
FIG. 3 is a schematic diagram for explaining flow of magnetic flux in the automotive alternator according to Embodiment 1 of the present invention.
Figure 4:
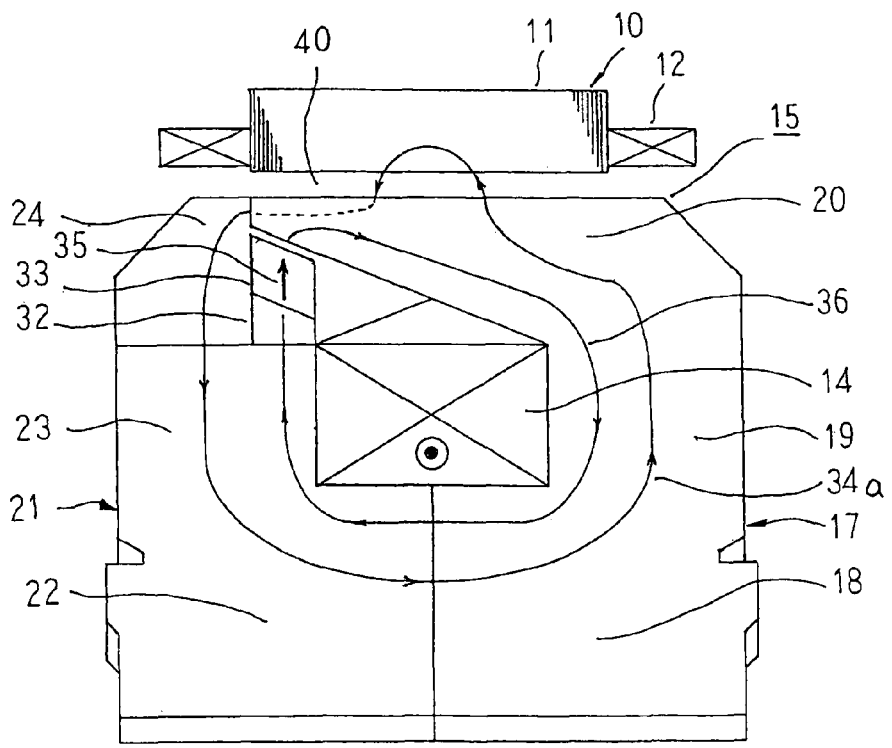
FIG. 4 is a schematic diagram for explaining flow of magnetic flux in the automotive alternator according to Embodiment 1 of the present invention.

FIG. 1 is a cross section that schematically shows an automotive alternator according to Embodiment 1 of the present invention, FIG. 2 is a perspective that shows a rotor that can be used in the automotive alternator according to Embodiment 1 of the present invention, and FIGS. 3 and 4 are respective schematic diagrams for explaining flow of magnetic flux in the automotive alternator according to Embodiment 1 of the present invention.

In FIGS. 1 and 2, an automotive alternator 1 includes: a case 4 that is constituted by a front bracket 2 and a rear bracket 3 that are each made of aluminum so as to have an approximate cup shape; a rotor 13 that is rotatably disposed inside the case 4 such that a shaft 16 is supported by means of bearings 5 in the case 4; a pulley 6 that is fixed to an end portion of the shaft 16 that projects outward at a front end of the case 4; fans 7 that are fixed to two end surfaces in an axial direction of the rotor 13; a stator 10 that is fixed to the case 4 so as to surround an outer circumference of the rotor 13 so as to have a constant air gap relative to the rotor 13; a pair of slip rings 8 that are fixed to a rear end of the shaft 16, and that supply current to the rotor 13; and a pair of brushes 9 that are disposed inside the case 4 so as to slide on the respective slip rings 8. Moreover, although not shown, a rectifier that rectifies an alternating current that is generated in the stator 10 into direct current, and a voltage regulator that adjusts magnitude of an alternating voltage generated in the stator 10, etc., are disposed inside the case 4.

The stator 10 includes: a cylindrical stator core 11; and a stator coil 12 that is mounted to the stator core 11, and in which an alternating current arises due to changes in magnetic flux from a field coil 14 (described below) that accompany rotation of the rotor 13.

The rotor 13 includes: a field coil 14 through which an excitation current that generates magnetic flux flows; a pole core 15 that is disposed so as to cover the field coil 14 and in which magnetic poles are formed by that magnetic flux; and the shaft 16, which is fitted through a central axial position of the pole core 15.

The pole core 15 is configured so as to be divided into first and second pole core bodies 17 and 21 that are each prepared by a cold forging manufacturing method using a low carbon steel such as S10C, for example.

The first pole core body 17 has: a first boss portion 18 that has an outer circumferential surface that has a cylindrical shape, and through which a shaft insertion hole is disposed at a central axial position; a thick ring-shaped first yoke portion 19 that is disposed so as to extend radially outward from a first end edge portion of the first boss portion 18; and first claw-shaped magnetic pole portions 20 that are disposed so as to extend toward a second axial end from outer circumferential portions of the first yoke portion 19. Eight, for example, first claw-shaped magnetic pole portions 20 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially.

The second pole core body 21 has: a second boss portion 22 that has an outer circumferential surface that has a cylindrical shape, and through which a shaft insertion aperture is disposed at a central axial position; a thick ring-shaped second yoke portion 23 that is disposed so as to extend radially outward from a second end edge portion of the second boss portion 22; and second claw-shaped magnetic pole portions 24 that are disposed so as to extend toward a first axial end from outer circumferential portions of the second yoke portion 23. Eight, for example, second claw-shaped magnetic pole portions 24 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform angular pitch circumferentially.

The first and second pole core bodies 17 and 21 that are configured in this manner are fixed to the shaft 16 that has been fitted through the shaft insertion apertures such that the first and second claw-shaped magnetic pole portions 20 and 24 alternately intermesh and a second end surface of the first boss portion 18 is abutted to a first end surface of the second boss portion 22. The field coil 14, which has been wound onto a bobbin (not shown), is mounted in a space that is surrounded by the first and second boss portions 18 and 22, the first and second yoke portions 19 and 23, and the first and second claw-shaped magnetic pole portions 20 and 24. Here, the first and second boss portions 18 and 22 and the first and second yoke portions 19 and 23 correspond to a boss portion and first and second yoke portions of the pole core 15. Furthermore, tip end portions of the first and second claw-shaped magnetic pole portions 20 and 24 overlap with the second and first yoke portions 23 and 19 in an axial direction.

First magnet seats 30 are prepared by a cold forging manufacturing method using a magnetic material such as a low carbon steel such as S10C, for example. The first magnet seats 30 are fixed onto outer circumferential surfaces of the first yoke portion 19 that face inner circumferential surfaces of tip end portions of each of the second claw-shaped magnetic pole portions 24 using adhesive, etc., so as to be magnetically connected. Upper surfaces of the first magnet seats 30 are formed so as to be approximately parallel to the inner circumferential surfaces of the second claw-shaped magnetic pole portions 24. In addition, first permanent magnets 31 are formed so as to have parallelogrammatic cross sections, and are fixed to the upper surfaces of the first magnet seats 30 so as to face the inner circumferential surfaces of the tip end portions of the second claw-shaped magnetic pole portions 24 using adhesive, etc., so as to be magnetically connected. Here, the respective first permanent magnets 31 are disposed so as to be positioned inside a projected region that is obtained by projecting the second claw-shaped magnetic pole portions 24 onto the first yoke portion 19 from radially above, and upper surfaces of each of the first permanent magnets 31 are approximately parallel to the inner circumferential surfaces of the second claw-shaped magnetic pole portions 24 so as to have a predetermined clearance.

Second magnet seats 32 that are identical to the first magnet seats 30 are fixed onto outer circumferential surfaces of the second yoke portion 23 that face inner circumferential surfaces of tip end portions of each of the first claw-shaped magnetic pole portions 20 using adhesive, etc., so as to be magnetically connected such that upper surfaces are approximately parallel to inner circumferential surfaces of the first claw-shaped magnetic pole portions 20. In addition, second permanent magnets 33 that are identical to the first permanent magnets 31 are fixed to the second magnet seats 32 so as to face the inner circumferential surfaces of the tip end portions of the first claw-shaped magnetic pole portions 20 using adhesive, etc., so as to be magnetically connected. Here, the respective second permanent magnets 33 are disposed so as to be positioned inside a projected region that is obtained by projecting the first claw-shaped magnetic pole portions 20 onto the second yoke portion 23 from radially above, and upper surfaces of each of the second permanent magnets 33 are approximately parallel to the inner circumferential surfaces of the first claw-shaped magnetic pole portions 20 so as to have a predetermined clearance.

The first and second permanent magnets 31 and 33 are magnetically oriented so as to have directions of magnetization 35 that are opposite to the orientation of a magnetic field 34 that the field current that flows through the field coil 14 produces in a plane that is perpendicular to a central axis of the rotor 13. In other words, if the magnetic field 34 is generated in the direction of the arrow as shown in FIG. 1 when the field current flows through the field coil 14, the first and second permanent magnets 31 and 33 are magnetically oriented in a reverse direction to the magnetic field 34. In this case, the directions of magnetization 35 of the first and second permanent magnets 31 and 33 are oriented radially, and extensions of the directions of magnetization 35 are directed at inner circumferential surfaces of the tip end portions of the facing first and second claw-shaped magnetic pole portions 20 and 24. Moreover, in the case of a design in which the orientation of the magnetic field 34 that the field current that flows through the field coil 14 produces is inverted, the first and second permanent magnets 31 and 33 will also be magnetically oriented in a reverse direction.

Next, action of an automotive alternator 1 that has been configured in this manner will be explained.

First, current is supplied from a battery (not shown) to the field coil 14 of the rotor 13 by means of the brushes 9 and the slip rings 8, generating magnetic flux. The first claw-shaped magnetic pole portions 20 of the first pole core body 17 are magnetized into North-seeking (N) poles by this magnetic flux, and the second claw-shaped magnetic pole portions 24 of the second pole core body 21 are magnetized into South-seeking (S) poles.

At the same time, rotational torque from an engine is transmitted to the shaft 16 by means of a belt (not shown) and the pulley 6, rotating the rotor 13. Thus, a rotating magnetic field is applied to the stator coil 12 of the stator 10, generating electromotive forces in the stator coil 12. These alternating-current electromotive forces are rectified into direct current by the rectifier to charge the battery or to be supplied to electric loads, etc.

Next, action of the magnetic flux will be explained with reference to FIGS. 3 and 4.

First, magnetic flux 34a is generated when an electric current is passed through the field coil 14. This magnetic flux 34a enters tooth portions of the stator core 11 by passing through the air gap 40 from the first claw-shaped magnetic pole portions 20. The magnetic flux 34a then moves circumferentially through a core back portion from the tooth portions of the stator core 11, and enters neighboring second claw-shaped magnetic pole portions 24 by passing through the air gap 40 from the tooth portions that face those second claw-shaped magnetic pole portions 24. Next, the magnetic flux 34a that has entered the second claw-shaped magnetic pole portions 24 passes through the second yoke portion 23, the second boss portion 22, the first boss portion 18, and the first yoke portion 19, and reaches the first claw-shaped magnetic pole portions 20. Now, in a conventional Lundell rotor, because the first and second pole core bodies are at their design limit, they are magnetically saturated by the magnetic field that is generated by the field coil, reducing magnetic flux that is generated in the rotor.

In Embodiment 1, the first and second permanent magnets 31 and 33 are magnetically oriented so as to be opposite to the orientation of the magnetic field 34 that is generated by the field coil 14. Thus, the orientation of the magnetic field that originates from the first and second permanent magnets 31 and 33 is in a reverse direction to the magnetic field 34 that is generated by the field coil 14. To interlink with the stator core 11, it is necessary for the magnetic flux 36 that originates from these first and second permanent magnets 31 and 33 to make a round trip across the air gap 40, which has a large magnetic resistance. The first and second permanent magnets 31 and 33 are disposed radially inside the second and first claw-shaped magnetic pole portions 24 and 20, and are disposed so as to circuit in a shorter magnetic path length to the inner circumferential surface sides of the first and second claw-shaped magnetic pole portions 20 and 24, than that to the stator core 11. Thus, a large portion of the magnetic flux 36 forms a closed magnetic circuit inside the rotor without going around through the stator core 11.

In other words, the magnetic flux 36 that originates from the first permanent magnets 31 passes from the first magnet seats 30 through the first yoke portion 19, the first boss portion 18, the second boss portion 22, the second yoke portion 23, and the second claw-shaped magnetic pole portions 24, and returns to the first permanent magnets 31. The magnetic flux 36 that originates from the second permanent magnets 33 enters the first claw-shaped magnetic pole portions 20 by means of the air gap, passes through the first yoke portion 19, the first boss portion 18, the second boss portion 22, the second yoke portion 23, and the second magnet seats 32, and returns to the second permanent magnets 33.

Thus, the magnetic flux 36 that originates from the first and second permanent magnets 31 and 33 is in a reverse direction from the magnetic flux 34a that originates from the field coil 14, enabling the magnetic flux density of the magnetic bodies that constitute the first and second pole core bodies 17 and 21 to be reduced significantly, thereby enabling magnetic saturation to be relieved.

Figures 5, 6:
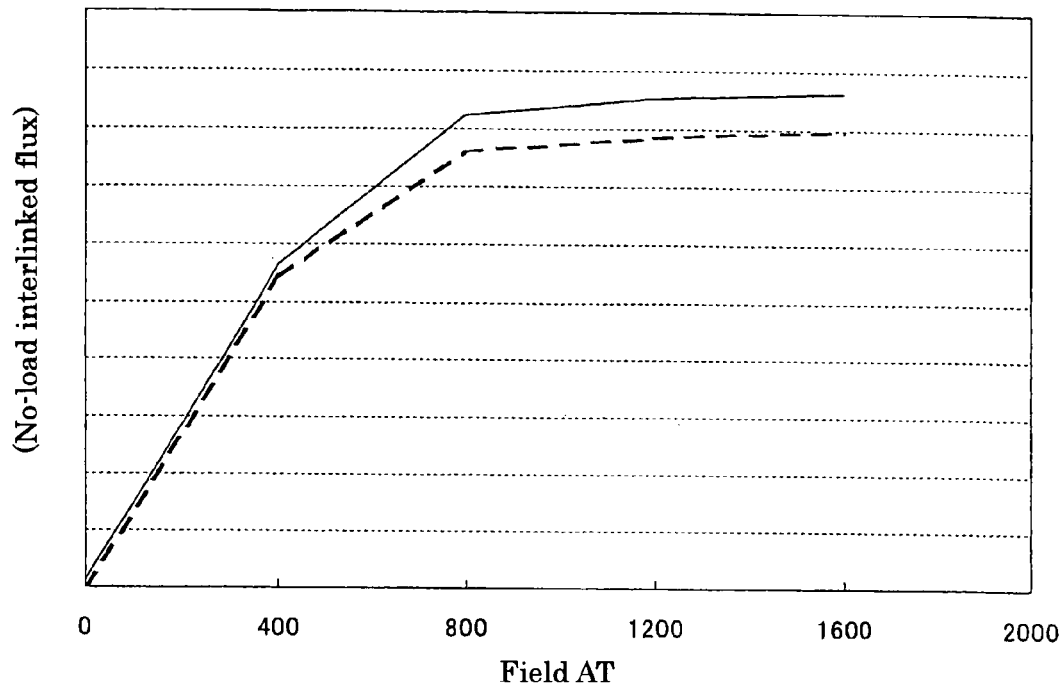
FIG. 5 is a graph that represents a relationship between field ampere turns (field AT) and stator interlinked magnetic flux in the automotive alternator according to Embodiment 1 of the present invention.
FIG. 6 is a table that shows generated power relative to rotational frequency in the automotive alternator according to Embodiment 1 of the present invention.

Next, stator interlinked magnetic flux relative to field ampere turns (field AT) and generated power relative to rotational frequency were measured using an automotive alternator 1 that was configured in this manner, and the results are shown in FIGS. 5 and 6. For comparison, a conventional device from which the first and second permanent magnets 31 and 33 were omitted was prepared, stator interlinked magnetic flux relative to field ampere turns (field AT) and generated power (direct current A) relative to rotational frequency were measured, and the results are also shown in FIGS. 5 and 6. Moreover, in FIG. 5, a solid line represents the present invention, and a broken line represents the comparative device.

It can be seen from FIG. 5 that the difference between the automotive alternator 1 and the conventional device is small in a region in which field AT is small, and the difference between the automotive alternator 1 and the conventional device increases when the field AT exceeds a region in which magnetic saturation begins. In other words, it can be seen that disposing the first and second permanent magnets 31 and 33 relieves magnetic saturation, thereby increasing the amount of magnetic flux that interlinks with the stator 10.

Similarly, it can be seen from FIG. 6 that greater generated power can be obtained in the automotive alternator 1 than in the conventional device, particularly in a low rotational range.

In other words, in conventional devices, thirty percent or more of the magnetomotive force of the field is expended in the magnetic circuit of the rotor as a result of magnetic saturation, making it difficult to increase the amount of magnetic flux. In Embodiment 1, on the other hand, because magnetic saturation is relieved as described above, it can be inferred that the magnetic flux that interlinks with the stator 10 is increased, increasing generated power. In particular, it has been confirmed that generated power can be increased significantly in a low-speed idling region where magnetic saturation is pronounced.

In Embodiment 1, because the first and second permanent magnets 31 and 33 are disposed so as to face inner circumferential surfaces of the first and second claw-shaped magnetic pole portions 20 and 24, the first and second permanent magnets 31 and 33 are positioned radially inside an external surface of the rotor 13. Thus, stator slot harmonics are confined to surface portions of the first and second claw-shaped magnetic pole portions 20 and 24, and do not act to heat the first and second permanent magnets 31 and 33 by direct induction. As a result, the first and second permanent magnets 31 and 33 are prevented from being heated and thermally demagnetized.

Because the first and second permanent magnets 31 and 33 are disposed so as to be positioned inside a projected region that is obtained by projecting tip end portions of the second and first claw-shaped magnetic pole portions 24 and 20 onto the first and second yoke portions 19 and 23 from radially above, the first and second permanent magnets 31 and 33 are not exposed on a side near the stator 10, reliably preventing induction heating due to stator slot harmonics.

Because the first and second permanent magnets 31 and 33 are disposed so as to face the inner circumferential surfaces of the first and second claw-shaped magnetic pole portions 20 and 24, the magnetic circuits of the first and second permanent magnets 31 and 33 are closed magnetic circuits inside the rotor, eliminating magnetic flux components that interlink with the stator 10. Thus, the occurrence of voltages induced by the first and second permanent magnets 31 and 33 during no-load de-energization is suppressed. As a result, the magnet volume of the first and second permanent magnets 31 and 33 can be increased.

The first and second permanent magnets 31 and 33 are mounted onto the first and second yoke portions 19 and 23. Thus, because the first and second permanent magnets 31 and 33 are positioned radially inside the first and second claw-shaped magnetic pole portions 20 and 24, centrifugal forces that act on the first and second permanent magnets 31 and 33 are reduced, enabling the holding construction for the first and second permanent magnets 31 and 33 to be simplified. Because the first and second permanent magnets 31 and 33 are not affected by the first and second claw-shaped magnetic pole portions 20 and 24, which are displaced greatly relative to centrifugal force, holding of the first and second permanent magnets 31 and 33 is facilitated. In addition, because the first and second permanent magnets 31 and 33 are not affected by axial displacement between the claw-shaped magnetic pole portions that results from thermal expansion of the rotor, holding of the first and second permanent magnets 31 and 33 is also facilitated if the present invention is applied to automotive alternators that have a wide temperature range. Because of these facts, the holding reliability for the first and second permanent magnets 31 and 33 is improved.

Because the first and second permanent magnets 31 and 33 are positioned radially inside the first and second claw-shaped magnetic pole portions 20 and 24, increases in moment of inertia that result from the first and second permanent magnets 31 and 33 being disposed can be reduced, also enabling increases in inertia torque to be suppressed.

Because the upper surfaces (the radially outer peripheral surfaces) of the first and second permanent magnets 31 and 33 are formed so as to have an angle of inclination that is equal to an angle of inclination of the inner circumferential surfaces of the second and first claw-shaped magnetic pole portions 24 and 20, the first and second permanent magnets 31 and 33 can be hidden radially below the tip end portions of the second and first claw-shaped magnetic pole portions 24 and 20 by disposing the first and second permanent magnets 31 and 33 so as to face the inner circumferential surfaces of the tip end portions of the second and first claw-shaped magnetic pole portions 24 and 20 in close proximity thereto. In this manner, reductions in axial size of the rotor 13, and consequently the automotive alternator, can be achieved.

In addition, lower surfaces of the first and second permanent magnets 31 and 33 (radially inner peripheral surfaces) are also formed so as to have an angle of inclination that is equal to the angle of inclination of the inner circumferential surfaces of the second and first claw-shaped magnetic pole portions 24 and 20. In other words, the first and second permanent magnets 31 and 33 are formed so as to have parallelogrammatic cross sections that have upper surfaces and lower surfaces that have an angle of inclination that is equal to the angle of inclination of the inner circumferential surfaces of the second and first claw-shaped magnetic pole portions 24 and 20. Thus, the first and second permanent magnets 31 and 33 are able to be inserted into the first and second yoke portions 19 and 23 from two axial ends after the first and second pole core bodies 17 and 21 have been assembled, improving assembly.

Because the first and second permanent magnets 31 and 33 are formed so as to have parallelogrammatic cross sections, the number of processing steps can be reduced when the first and second permanent magnets 31 and 33 are manufactured by cutting from bulky magnet materials, etc.

Embodiment 2

In Embodiment 1 above, the direction of magnetization 35 of the first and second permanent magnets 31 and 33 is oriented radially, but in Embodiment 2, a direction of magnetization 35 of first and second permanent magnets 31 and 33 is inclined toward a field coil 14 relative to a radial direction.

Moreover, the rest of the configuration is configured in a similar manner to Embodiment 1 above.

Figure 7:
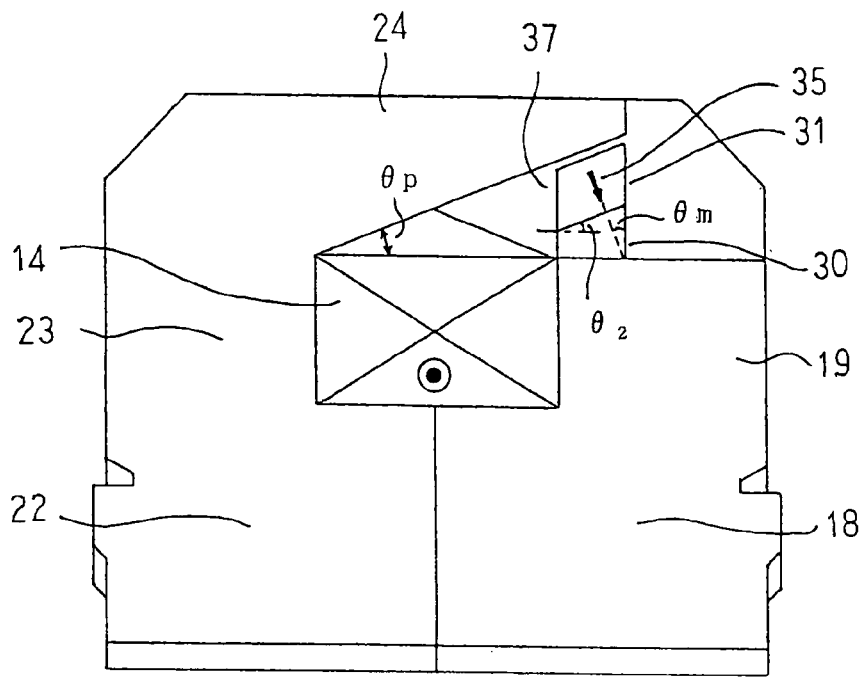
FIG. 7 is a schematic diagram for explaining direction of magnetization of permanent magnets in an automotive alternator according to Embodiment 2 of the present invention.

In FIG. 7, the first permanent magnets 31 are formed so as to have parallelogrammatic cross sections, and are fixed to upper surfaces of the first magnet seats 30 so as to face the inner circumferential surfaces of the tip end portions of the second claw-shaped magnetic pole portions 24 using an adhesive, etc., so as to be magnetically connected. The upper surfaces of the first permanent magnets 31 are approximately parallel to the inner circumferential surfaces of the second claw-shaped magnetic pole portions 24 so as to have a predetermined clearance. The directions of magnetization 35 of the first permanent magnets 31 are inclined in a plane that includes the central axis of the rotor 13 (the central axis of the shaft 16) by an angle θm toward the field coil 14 relative to the radial direction (a plane that is perpendicular to the central axis of the rotor 13). Moreover, although not shown, the directions of magnetization 35 of the second permanent magnet 33 are also inclined by an angle θm toward the field coil 14 relative to the radial direction.

First, problems when the directions of magnetization 35 are aligned radially will be explained in order to explain the effects of inclining the directions of magnetization 35 of the first and second permanent magnets 31 and 33 in the plane that includes the central axis of the rotor 13 by an angle θm toward the field coil 14 relative to the plane that is perpendicular to the central axis of the rotor 13 (the radial direction).

As shown in FIG. 3, the magnetic flux 34a that the field coil 14 produces enters the stator core 11 from the first claw-shaped magnetic pole portions 20 via the air gap 40, and reenters the second claw-shaped magnetic pole portion 24 via the air gap 40. At this time, it is easier for the magnetic flux 34a to enter the stator core 11 from root base portions of the first claw-shaped magnetic pole portions 20, and components of the magnetic flux 34a are reduced closer to the tip ends, the components of the magnetic flux 34a being practically eliminated at tip end portions. Similarly, it is easier for the magnetic flux 34a to enter the root base portion of the second claw-shaped magnetic pole portions 24 from the stator core 11, and the components of the magnetic flux 34a are reduced closer to the tip ends, the components of the magnetic flux 34a being practically eliminated at tip end portions.

If the directions of magnetization 35 are aligned radially under such conditions, the magnetic flux 36 that the first permanent magnets 31 produce flows through the second claw-shaped magnetic pole portions 24 from root end portions to tip end portions, and enters the first permanent magnets 31 from these tip end portions. The magnetic flux 36 that the second permanent magnets 33 produce enters the tip end portions of the first claw-shaped magnetic pole portions 20 from the second permanent magnets 33. Thus, the magnetic flux 36 that flows through the tip end portions of the first and second claw-shaped magnetic pole portions 20 and 24, which have a small magnetic path cross-sectional area, is not canceled out by the magnetic flux 34a that the field coil 14 produces. As a result, the magnetic paths at the tip end portions of the first and second claw-shaped magnetic pole portions 20 and 24 become magnetically saturated, reducing the amount of magnetic flux that is applied to the rotor 13 by the first and second permanent magnets 31 and 33. In other words, the utilization factor of the first and second permanent magnets 31 and 33 is reduced.

Magnetic resistance from the root portions toward the tip end portions of the second claw-shaped magnetic pole portions 24 is increased by this magnetic saturation, making it impossible to close the magnetic flux 36 inside the rotor, and giving rise to leakage flux that interlinks with the stator 10 and moves circumferentially. The generation of this leakage flux gives rise to the generation of reverse electromotive force during no-load de-energization. Thus, if magnet volume is increased in order to maximize the effects of the magnets, this reverse electromotive force increases further, and in some cases may even exceed 12 V. In that case, a reverse excitation circuit in which the direction of the field current is inverted is required.

Here, by inclining the directions of magnetization 35 of the first and second permanent magnets 31 and 33 by an angle θm toward the field coil 14 relative to the radial direction, the magnetic flux 36 from the first permanent magnets 31 passes through the space 37 and enters the first permanent magnets 31 before it reaches the tip end portions of the second claw-shaped magnetic pole portions 24. The magnetic flux 36 from the second permanent magnets 33 passes through spaces at intersecting portions between the second permanent magnets 33 and the first claw-shaped magnetic pole portions 20 that are closer to the field coil 14, and enters the first claw-shaped magnetic pole portions 20 from regions of the tip end portions of the first claw-shaped magnetic pole portions 20 that are closer to the root bases. Thus, the magnetic paths at the tip end portions of the first and second claw-shaped magnetic pole portions 20 and 24 are no longer magnetically saturated, enabling the magnetic flux 36 to form a closed circuit inside the rotor without interlinking with the stator 10.

Because magnetic saturation in the tip end portions of the first and second claw-shaped magnetic pole portions 20 and 24 is thereby avoided compared to when the magnetic flux 36 passes through the tip end portions of the first and second claw-shaped magnetic pole portions 20 and 24 (when the directions of magnetization 35 are aligned radially), the utilization factor of the magnetic flux from the magnets can be increased, also enabling the generation of reverse electromotive force to be suppressed.

Figure 8:
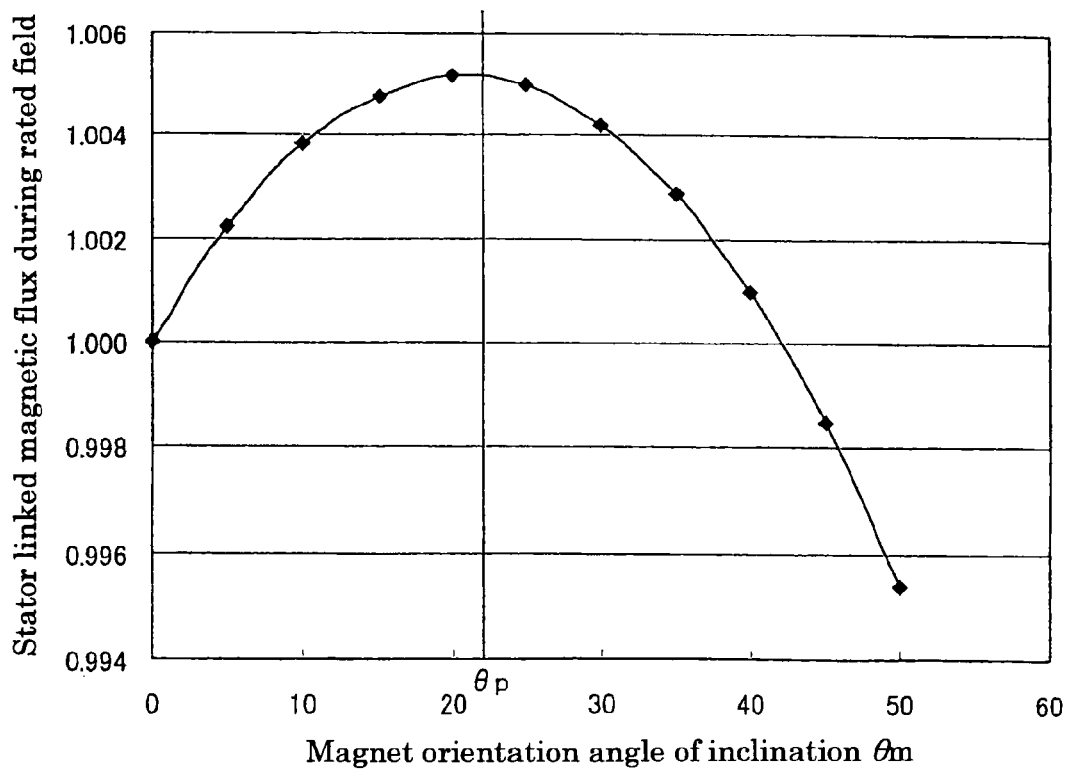
FIG. 8 is a graph that represents a relationship between an angle of inclination θm of the direction of magnetization of the permanent magnets and stator interlinked magnetic flux Φ in the automotive alternator according to Embodiment 2 of the present invention.

Now, stator linked magnetic flux $\Phi$ when a rated electric current was passed through the field was measured using the angle $\theta m$ of the direction of magnetization 35 of the first and second permanent magnets 31 and 33 relative to the radial direction as a parameter, the results being shown in FIG. 8. Moreover, the magnetic flux $\Phi$ when the direction of magnetization 35 is oriented radially ($\theta m=0$) was standardized to 1. Here, an angle $\theta p$ that is formed between the inner circumferential surfaces of the first and second claw-shaped magnetic pole portions 20 and 24 and the central axis of the rotor 13 was 22 degrees.

Figure 9:
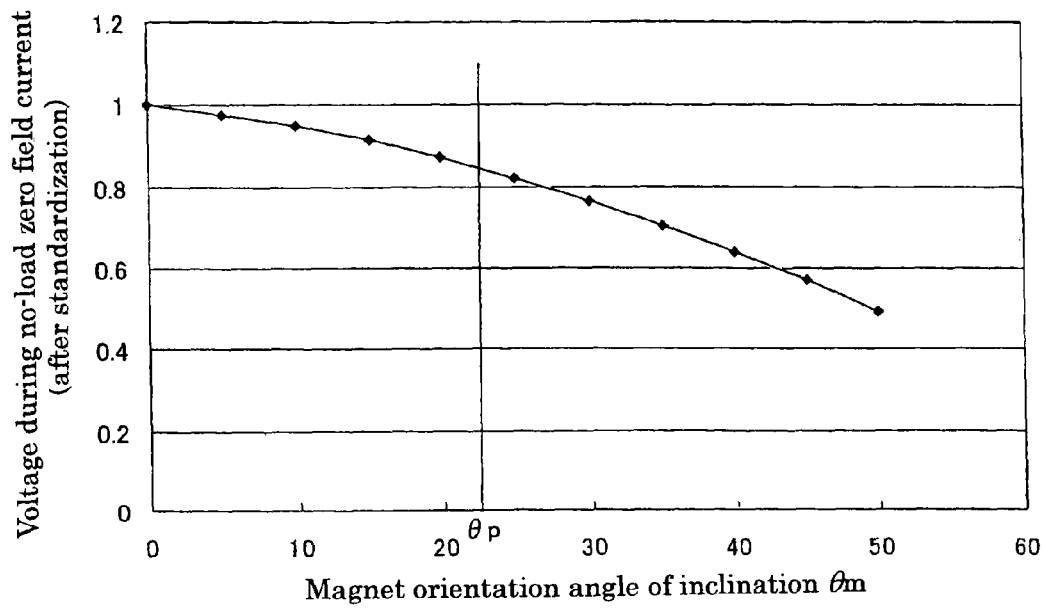
FIG. 9 is a graph that represents a relationship between the angle of inclination θm of the direction of magnetization of the permanent magnets and reverse electromotive force during no-load de-energization in the automotive alternator according to Embodiment 2 of the present invention.

Reverse electromotive force was also measured during no-load de-energization (no current passing to the field) using the angle $\theta m$ as a parameter, the results being shown in FIG. 9. Moreover, the reverse electromotive force when the direction of magnetization 35 is oriented radially ($\theta m=0$) was standardized to 1.

It can be seen from FIG. 8 that the magnetic flux $\Phi$ increases as the angle $\theta m$ increases from zero degrees, and the magnetic flux $\Phi$ decreases as the angle $\theta m$ becomes greater than $\theta p$. In other words, the magnetic flux $\Phi$ is at a maximum when the angle $\theta m$ is $\theta p$, that is, when the direction of magnetization 35 is perpendicular to the inner circumferential surfaces of the first and second claw-shaped magnetic pole portions 20 and 24.

It can be seen from FIG. 9 that the reverse electromotive force decreases as the angle $\theta m$ increases from zero degrees. It can also be seen that the reverse electromotive force during no-load de-energization can be reduced by nearly 20 percent when the angle $\theta m$ is $\theta p$ compared to when the angle $\theta m$ is 0 degrees.

From this, when the upper surfaces of the first and second permanent magnets 31 and 33 and the upper surfaces of the first and second magnet seats 30 and 32 are formed so as to be approximately parallel to the inner circumferential surfaces of the first and second claw-shaped magnetic pole portions 20 and 24, magnetic flux $\Phi$ that is greater than or equal to when magnets are disposed so as to have a direction of magnetization 35 in a radial direction can be obtained if the angle $\theta m$ is set to greater than or equal to 0 degrees and less than or equal to 42 degrees.

In addition, if consideration is given to reducing the reverse electromotive force during no-load de-energization, it is desirable to set the angle $\theta m$ to greater than or equal to $\theta p$ and less than or equal to 42 degrees.

Next, a case in which an angle $\theta_2$ that is formed between the upper surfaces of the first and second magnet seats 30 and 32 and an axial direction of the rotor 13 is different than the angle $\theta p$ will be explained. Moreover, FIG. 7 represents a case in which the angle $\theta_2$ matches the angle $\theta p$, and FIG. 10 represents a case in which the angle $\theta_2$ is 0 degrees.

In FIG. 7, because the angle $\theta_2$ matches the angle $\theta p$, magnetic flux that enters the first permanent magnets 31 so as to be perpendicular to the inner circumferential surfaces of the second claw-shaped magnetic pole portions 24 will continue straight on, and enter the first magnet seats 30 so as to be perpendicular to the upper surfaces of the first magnet seats 30.

Figure 10:
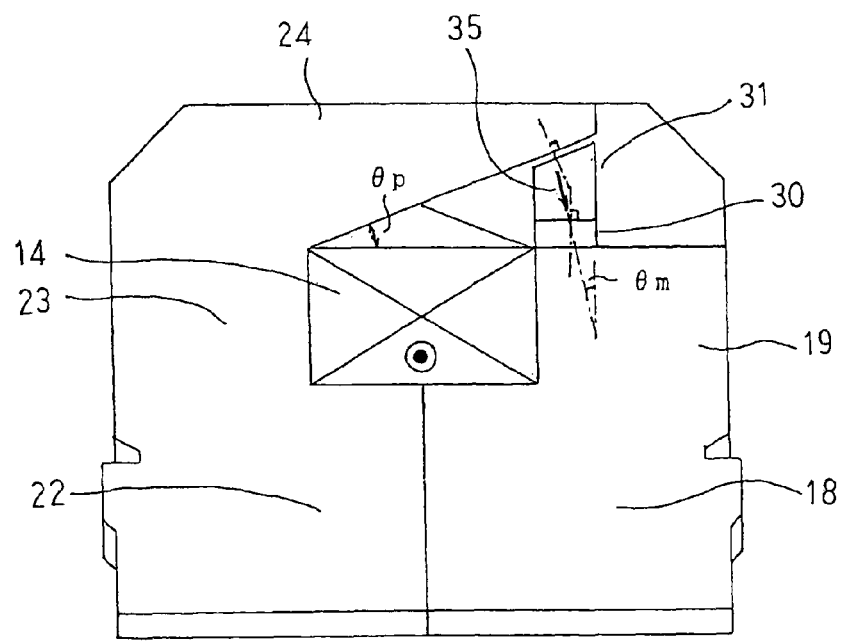
FIG. 10 is a schematic diagram for explaining direction of magnetization of permanent magnets in a preferred variation of the automotive alternator according to Embodiment 2 of the present invention.

In FIG. 10, on the other hand, magnetic flux enters the first permanent magnets 31 so as to be perpendicular to the inner circumferential surfaces of the second claw-shaped magnetic pole portions 24. The magnetic flux that has entered the first permanent magnets 31 gradually changes its inclination until the direction of the magnetic flux is oriented in a direction that is perpendicular to the upper surfaces of the first magnet seats 30, and enters the first magnet seats 30 so as to be perpendicular to the upper surfaces of the first magnet seats 30.

Now, in order to maximize the magnetic flux produced by the permanent magnets, it is necessary to join the inner circumferential surfaces of the tip end portions of the claw-shaped magnetic pole portions and the upper surfaces of the magnet seats that are on opposite sides of the permanent magnets by the shortest pathway to reduce magnetic resistance. Because the entry pathway of the magnetic flux into iron and the exit pathway of the magnetic flux from iron are perpendicular to the surface of the iron, it is desirable to make the directions of magnetization of the magnets perpendicular to the surface of the iron. From this, it is desirable to make the direction of magnetization at the upper surfaces of the magnets perpendicular to the inner circumferential surface of the claw-shaped magnetic pole portions, and gradually change the direction of magnetization to make the direction of magnetization at the lower surfaces of the magnets perpendicular to the upper surfaces of the magnet seats. However, if the direction of magnetization is made anisotropic in this manner, costs for manufacturing the magnets become significantly higher, making the method unrealistic. Here, satisfactory performance can be achieved, and manufacturing costs can be reduced, by magnetizing the magnets at an angle that is taken from the average of the angles of the direction of magnetization between the upper surfaces and the lower surfaces. In other words, it is desirable to set the angle $\theta m$ of the direction of magnetization of the magnets to $(\theta p+\theta_2)/2$.

Figure 11:
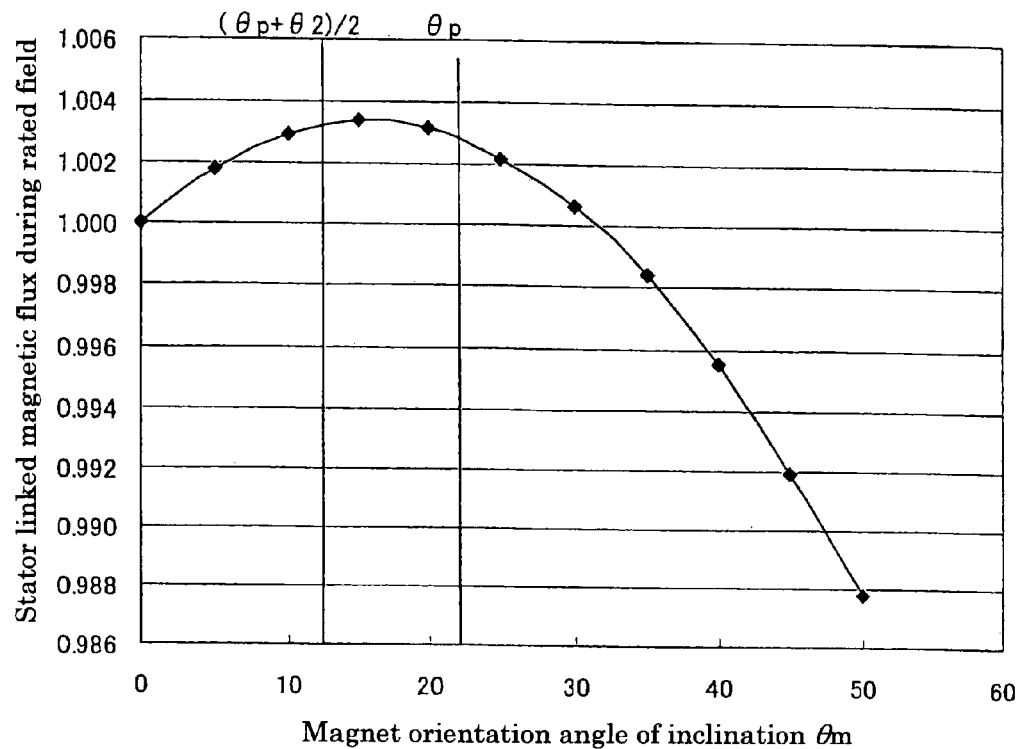
FIG. 11 is a graph that represents a relationship between an angle of inclination θm of the direction of magnetization of the permanent magnets and stator interlinked magnetic flux Φ in the preferred variation of the automotive alternator according to Embodiment 2 of the present invention.

Next, stator linked magnetic flux $\Phi$ in a rotor configuration that is shown in FIG. 10 when a rated electric current was passed through the field was measured using the angle $\theta m$ of the direction of magnetization 35 of the first and second permanent magnets 31 and 33 relative to the radial direction as a parameter, the results being shown in FIG. 11. Moreover, the magnetic flux $\Phi$ when the direction of magnetization 35 is oriented radially ($\theta m=0$) was standardized to 1. Here, the angle $\theta p$ that is formed between the inner circumferential surfaces of the first and second claw-shaped magnetic pole portions 20 and 24 and the central axis of the rotor was 22 degrees.

Figure 12:
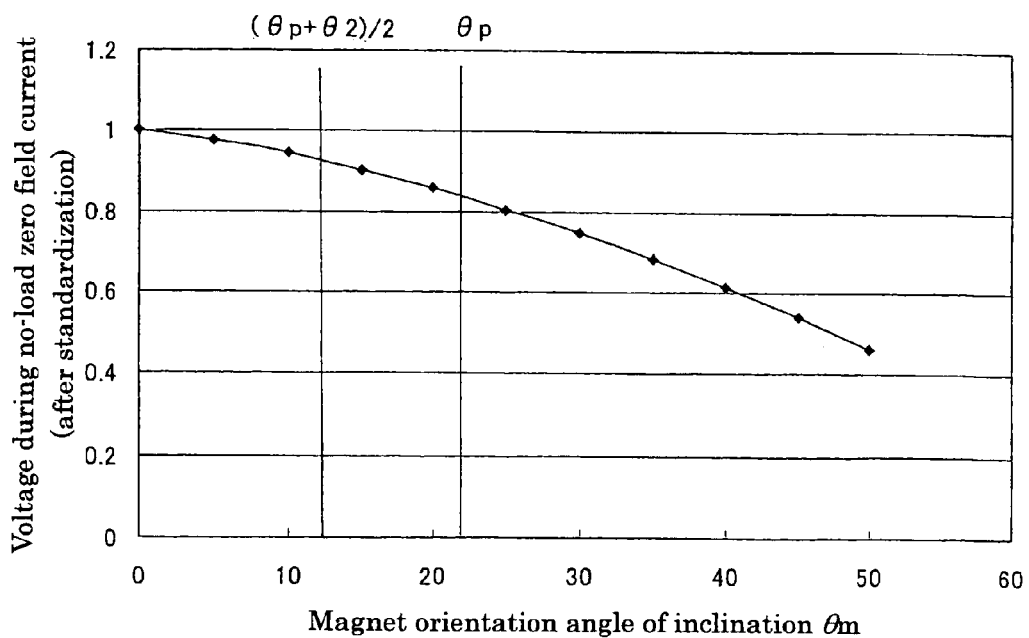
FIG. 12 is a graph that represents a relationship between the angle of inclination θm of the direction of magnetization of the permanent magnets and reverse electromotive force during no-load de-energization in the preferred variation of the automotive alternator according to Embodiment 2 of the present invention.

Reverse electromotive force was also measured during no-load de-energization (no current passing to the field) using the angle $\theta m$ as a parameter, the results being shown in FIG. 12. Moreover, the reverse electromotive force when the direction of magnetization 35 is oriented radially ($\theta m=0$) was standardized to 1.

It can be seen from FIG. 11 that the magnetic flux $\Phi$ increases as the angle $\theta m$ increases from zero degrees, the magnetic flux $\Phi$ is at a maximum when the angle $\theta m$ is at an angle slightly greater than $(\theta p+\theta_2)/2$, and the magnetic flux $\Phi$ decreases as the angle $\theta m$ becomes even greater.

It can be seen from FIG. 12 that the reverse electromotive force decreases as the angle $\theta m$ increases from zero degrees. It can also be seen that the reverse electromotive force during no-load de-energization can be reduced by nearly 10 percent when the angle θm is approximately (θp+θ$_2$)/2 compared to when the angle θm is 0 degrees.

From this, when the upper surfaces of the first and second permanent magnets 31 and 33 are formed so as to be approximately parallel to the inner circumferential surfaces of the first and second claw-shaped magnetic pole portions 20 and 24, and the upper surfaces of the first and second magnet seats 30 and 32 are inclined by an angle θ$_2$ relative to the central axis of the rotor 13, magnetic flux Φ that is greater than or equal to when magnets are disposed so as to have a direction of magnetization 35 in a radial direction can be obtained if the angle θm is set to greater than or equal to 0 degrees and less than or equal to 32 degrees.

In addition, if consideration is given to reducing the reverse electromotive force during no-load de-energization, it is desirable to set the angle θm to greater than or equal to (θp+θ$_2$)/2 and less than or equal to 32 degrees.

Now, because the upper surfaces of the first and second permanent magnets 31 and 33 in the rotor that is shown in FIG. 10 are also formed so as to have an angle of inclination that is equal to an angle of inclination of the inner circumferential surfaces of the second and first claw-shaped magnetic pole portions 24 and 20, the first and second permanent magnets 31 and 33 can be hidden radially below the tip end portions of the second and first claw-shaped magnetic pole portions 24 and 20 by disposing the first and second permanent magnets 31 and 33 so as to face the inner circumferential surfaces of the tip end portions of the second and first claw-shaped magnetic pole portions 24 and 20 in close proximity thereto. In this manner, reductions in axial size of the rotor 13, and thus the automotive alternator can be achieved.

Because the upper surfaces of the first and second permanent magnets 31 and 33 in the rotor that is shown in FIG. 10 are also formed so as to have an angle of inclination that is equal to an angle of inclination of the inner circumferential surfaces of the second and first claw-shaped magnetic pole portions 24 and 20, and the angle that is formed between the axial direction and the lower surfaces of the first and second permanent magnets 31 and 33 is 0 degrees, length of the first and second permanent magnets 31 and 33 in the direction of magnetization is longer, enabling the magnet magnetomotive force to be increased, and also enabling magnetic saturation alleviation effects due to the magnets to be further increased.

Embodiment 3

Figure 13:
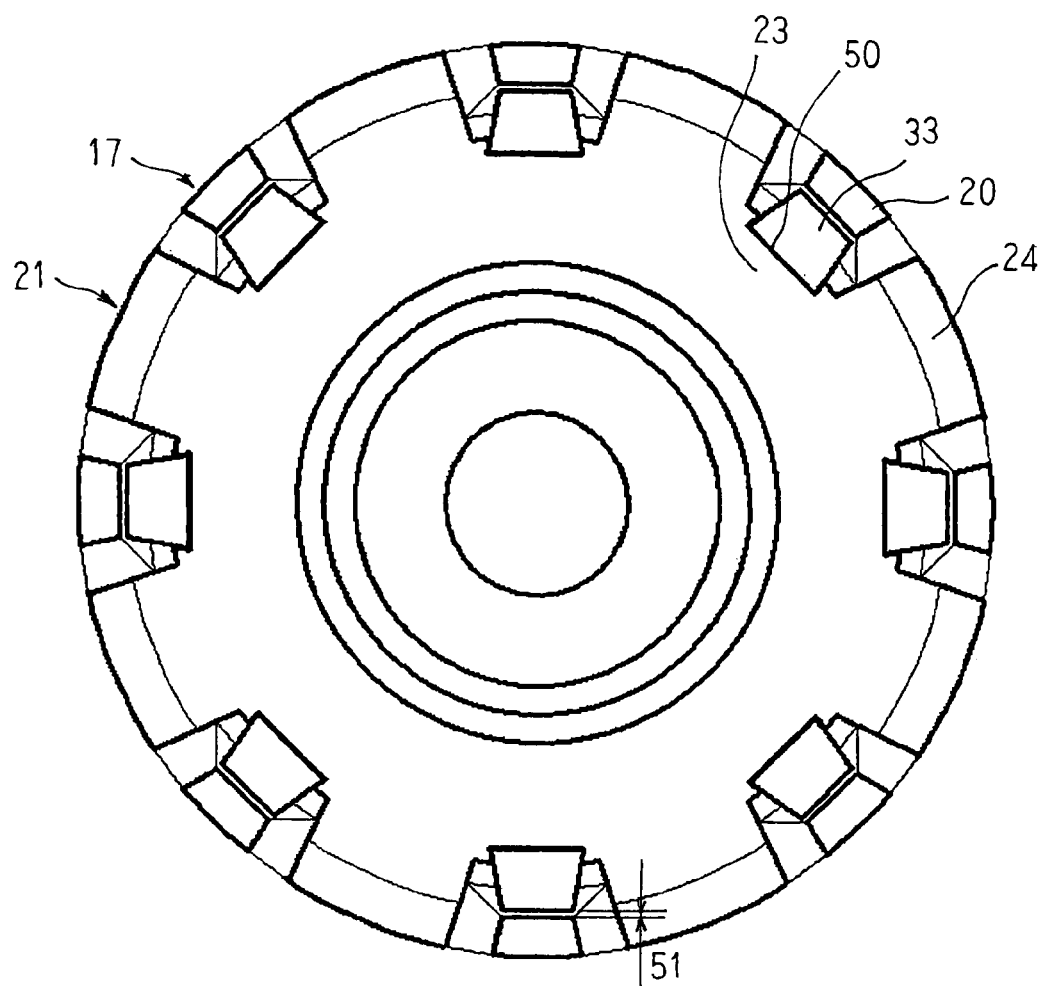
FIG. 13 is an end elevation that shows a rotor that can be used in an automotive alternator according to Embodiment 3 of the present invention.

FIG. 13 is an end elevation that shows a rotor that can be used in an automotive alternator according to Embodiment 3 of the present invention.

In FIG. 13, tapered grooves 50 that function as interfitting recess portions are disposed so as to extend axially on outer circumferential surfaces of a second yoke portion 23 that are positioned between second claw-shaped magnetic pole portions 24 of a second pole core body 21 so as to have internal shapes in which two side walls slant inward. Second permanent magnets 33 are also formed so as to have trapezoidal cross sections that fit together with the tapered grooves 50. The second permanent magnets 33 are press-fitted into the tapered grooves 50 from axially outside, and held.

Although not shown, tapered grooves 50 are also disposed so as to extend axially on outer circumferential surfaces of a first yoke portion 19 that are positioned between first claw-shaped magnetic pole portions 20 of a first pole core body 17. First permanent magnets 31 are formed so as to have trapezoidal cross sections that fit together with the tapered grooves 50, and are press-fitted into the tapered grooves 50 from axially outside, and held.

Moreover, the rest of the configuration is configured in a similar manner to Embodiment 1 above.

In Embodiment 3, because the first and second permanent magnets 31 and 33 are held in the tapered grooves 50 that are formed on the first and second yoke portions 19 and 23 by press-fitting from axially outside, the magnets can be mounted easily, and a need for first and second magnet seats 30 and 32 is also eliminated, enabling the number of parts to be reduced.

Here, it is desirable to set a gap 51 between the inner circumferential surfaces of the first and second claw-shaped magnetic pole portions 20 and 24 and the first and second permanent magnets 31 and 33 to greater than or equal to 0.05 mm so as not to be affected by machining tolerances and thermal displacement, etc., of the first and second pole core bodies 17 and 21, and also vibration of the first and second claw-shaped magnetic pole portions 20 and 24. Thus, displacement of the first and second claw-shaped magnetic pole portions 20 and 24 is not transmitted to the first and second permanent magnets 31 and 33 directly, enabling the formation of cracks in the first and second permanent magnets 31 and 33, which are prepared using sintered bodies, to be suppressed.

It is not desirable for the gaps 51 to be greater than or equal to the air gap 40 between the rotor 13 and the stator 10 from the viewpoint of the magnetic circuit. Thus, it is desirable to make the gaps 51 narrower than the air gap 40. Magnetic influence that results from the disposition of the gaps 51 can thereby be ignored.

From the above, in order to avoid the influence of machining tolerances and thermal displacement of the pole cores, and vibration of the claw-shaped magnetic pole portions, and to relieve problems relating to the magnetic circuit, it is desirable to set the gaps 51 to greater than or equal to 0.05 mm and less than 0.35 mm if the air gap 40 is 0.35 mm.

Embodiment 4

Figure 14:
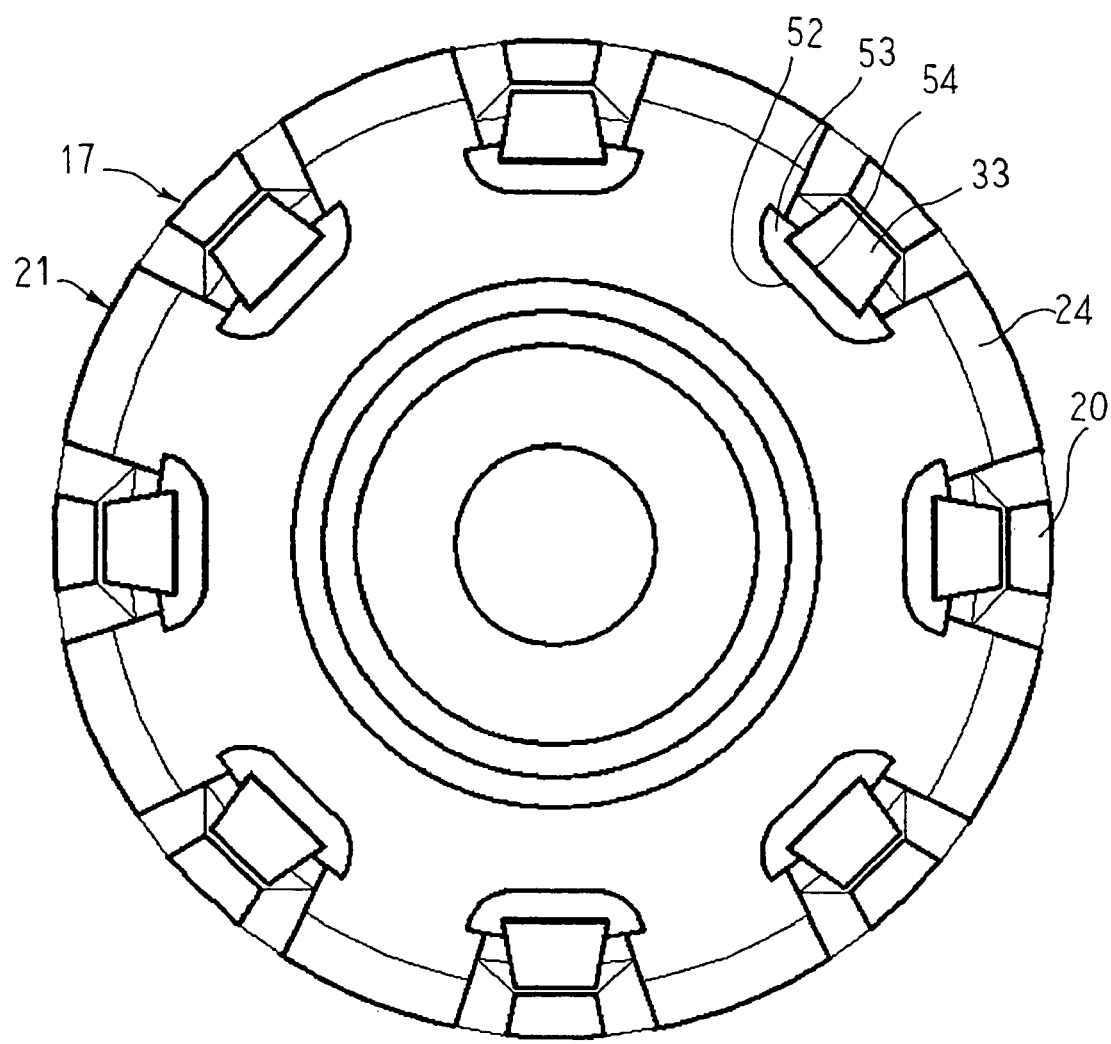
FIG. 14 is an end elevation that shows a rotor that can be used in an automotive alternator according to Embodiment 4 of the present invention.

FIG. 14 is an end elevation that shows a rotor that can be used in an automotive alternator according to Embodiment 4 of the present invention.

In FIG. 14, recessed grooves 52 that function as interfitting recess portions are disposed so as to extend axially on outer circumferential surfaces of a second yoke portion 23 that are positioned between second claw-shaped magnetic pole portions 24 of a second pole core body 21. Magnet seats 53 are prepared using a magnetic material such as S10C, etc. These magnet seats 53 are formed so as to have external shapes that are held by press-fitting into the recessed grooves 52, and in addition, tapered grooves 54 that have internal shapes in which two side walls slant inward are formed on upper surfaces. Second permanent magnets 33 are also formed so as to have trapezoidal cross sections that fit together with the tapered grooves 54. The second permanent magnets 33 are press-fitted into the tapered grooves 50, and held by the magnet seats 53. The magnet seats 53 are press-fitted into the recessed grooves 52 from axially outside, and held.

Moreover, although not shown, recessed grooves 52 are formed on upper surfaces of a first yoke portion 19, magnet seats 53 are press-fitted into the recessed grooves from axially outside, and held, and in addition, first permanent magnets 31 are press-fitted into and held by tapered grooves 54 of the magnet seats 53.

According to Embodiment 4, because the first and second permanent magnets 31 and 33 are press-fitted into and held by the tapered grooves 54 of the magnet seats 53, the first and second permanent magnets 31 and 33 can be handled in a state in which they are held by the magnet seats 53, suppressing the occurrence of cracking or chipping of the first and second permanent magnets 31 and 33.

Because the magnet seats 53 are press-fitted into the recessed grooves 52 from axially outside in a state in which the first and second permanent magnets 31 and 33 are held, external forces do not act on the first and second permanent magnets 31 and 33, enabling the occurrence of cracking and chipping of the first and second permanent magnets 31 and 33 to be suppressed during assembly.

Because the magnet seats 53 are prepared as separate parts from the first and second pole core bodies 17 and 21 using a magnetic material such as S10C, etc., milling precision for the magnet seats 53 can be increased. Thus, although milling precision for the permanent magnets 31 and 33 cannot be increased because they are sintered bodies, interfitting accuracy between the permanent magnets 31 and 33 and the magnet seats 53 can be increased because the milling precision of the magnet seats 53 is high, suppressing the occurrence of cracking and chipping of the permanent magnets 31 and 33. Because the first and second pole core bodies 17 and 21 are bent after cold forging manufacturing, after-processing such as cutting, etc., is required in order to increase milling precision. However, because the milling precision of the magnet seats 53 is high, interfitting precision between the yoke portions 19 and 23 and the magnet seats 53 can be increased, enabling after-processing of the pole core bodies 17 and 21 to be omitted.

Embodiment 5

Figure 15:
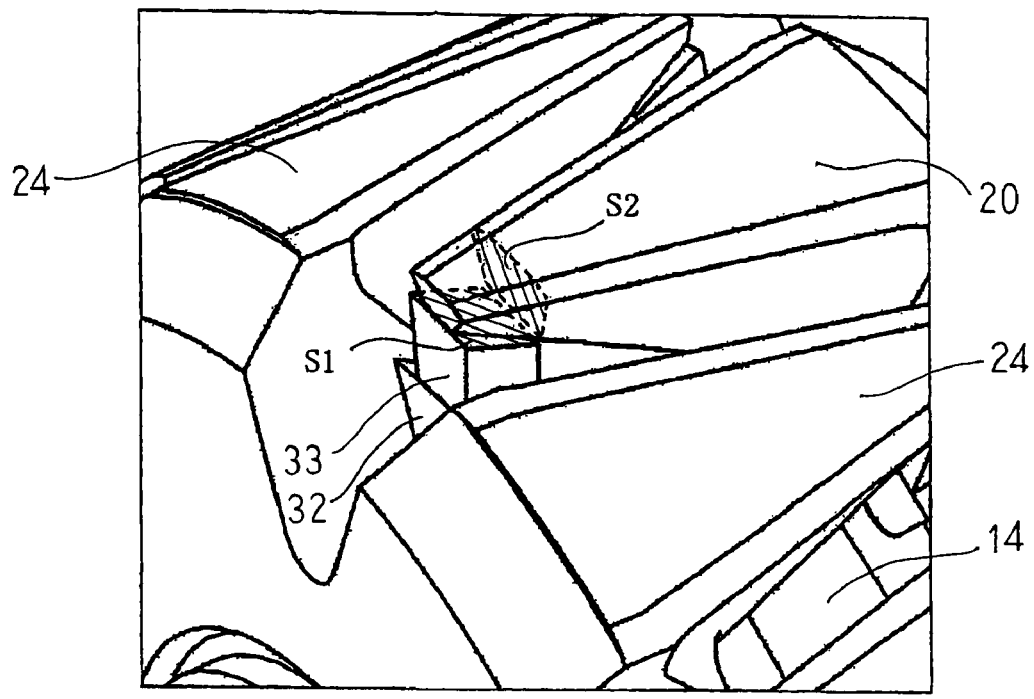
FIG. 15 is a perspective that shows part of a rotor that can be used in an automotive alternator according to Embodiment 5 of the present invention.

In Embodiment 5, as shown in FIG. 15, second permanent magnets 33 and first claw-shaped magnetic pole portions 20 are prepared so as to satisfy an expression $S1/S2 \leq 1.3$, where S1 is area of an upper surface of the second permanent magnets 33 that faces the first claw-shaped magnetic pole portions 20, and S2 is cross-sectional area of the first claw-shaped magnetic pole portions 20 in a plane that passes through an axially innermost portion of the upper surface of the second permanent magnets 33 and that is perpendicular to a central axis of a shaft 16. Although not shown, first permanent magnets 31 and second claw-shaped magnetic pole portions 24 are also prepared so as to satisfy an expression $S1/S2 \leq 1.3$, where S1 is area of an upper surface of the first permanent magnets 31 that faces the second claw-shaped magnetic pole portions 24, and S2 is cross-sectional area of the second claw-shaped magnetic pole portions 24 in a plane that passes through an axially innermost portion of the upper surface of the first permanent magnets 33 and that is perpendicular to the central axis of the shaft 16. Moreover, the rest of the configuration is configured in a similar manner to Embodiment 1 above.

Hereinafter, to facilitate explanation the first claw-shaped magnetic pole portions 20 and the second permanent magnets 33 will be explained as an example.

Now, the magnetic saturation alleviating effects that were explained in Embodiment 1 above can be increased by increasing the amount of magnetic flux that is generated by the second permanent magnets 33. However, if the amount of magnetic flux that is generated by the second permanent magnets 33 is increased, the first claw-shaped magnetic pole portions 20 easily become magnetically saturated by the magnetic flux that is generated by the second permanent magnets 33 since the magnetic flux that is generated by the second permanent magnets 33 is concentrated at the tip end portions of the first claw-shaped magnetic pole portions 20. If the first claw-shaped magnetic pole portions 20 are magnetically saturated, leakage flux that moves toward the stator 10 from the second permanent magnets 33 increases. If the leakage flux enters the stator 10, induced voltages during no-load de-energization increase since the leakage flux interacts with the stator coil 12.

If the tip end portions of the first claw-shaped magnetic pole portions 20 are made extremely thick in order to avoid this, centrifugal forces increase during high-speed rotation of the rotor 13, and problems arise such as the first claw-shaped magnetic pole portions 20 being curved into a splayed shape, and the tip end portions of the first claw-shaped magnetic pole portions 20 coming in contact with the stator 10, etc.

Thus, it is important to design the shape of the first and second claw-shaped magnetic pole portions 20 and 24 such that resistance of the rotor 13 against centrifugal force strength during the high-speed rotation is ensured, and the generation of induced voltage during no-load de-energization is suppressed.

Next, relationships among the areas S1 and S2 and induced voltage during no-load de-energization will be explained.

The amount of magnetic flux $\phi$gap that passes through the air gap between the claw-shaped magnetic pole portions and the permanent magnets is expressed by Expression 1.

The amount of magnetic flux $\phi$claw that passes through the cross section of the claw-shaped magnetic pole portions in a plane that passes through an axially innermost portion of the upper surface of the permanent magnets and that is perpendicular to the central axis of the shaft is expressed by Expression 2. Moreover, Bgap is the magnetic flux density in the air gap portion, and Bs is the saturated magnetic flux density of the claw-shaped magnetic pole portions.

$$\phi\text{gap} = B\text{gap} \times S1 \quad (1)$$

$$\phi\text{claw} = Bs \times S2 \quad (2)$$

Now, if all of the magnetic flux that is generated by the permanent magnets is interlink with the claw-shaped magnetic pole portions, Expression 3 can be obtained from the relationship $\phi\text{gap} = \phi\text{claw}$.

$$Bs = B\text{gap} \times (S1/S2) \quad (3)$$

From Expression 3, whether or not the claw-shaped magnetic pole portions are magnetically saturated can be prescribed by Bgap and (S1/S2).

For example, if sintered rare-earth magnets in which magnetic flux density is high such as neodymium-iron-boron magnets, samarium-cobalt magnets, etc., are used for the permanent magnets, then Bgap is approximately 1.1 T. If a carbon steel such as S10C, etc., is used for the claw-shaped magnetic pole portions in order to balance magnetic properties and strength, then Bs is approximately 1.8 T.

From this, if (S1/S2) exceeds approximately 1.6, the claw-shaped magnetic pole portions will be in a magnetically saturated state, and magnetic resistance at the tip end portions of the claw-shaped magnetic pole portions will increase gradually, generating a large quantity of leakage flux. In practice, induced voltage during no-load de-energization gradually increases before reaching magnetic saturation.

Figure 16:
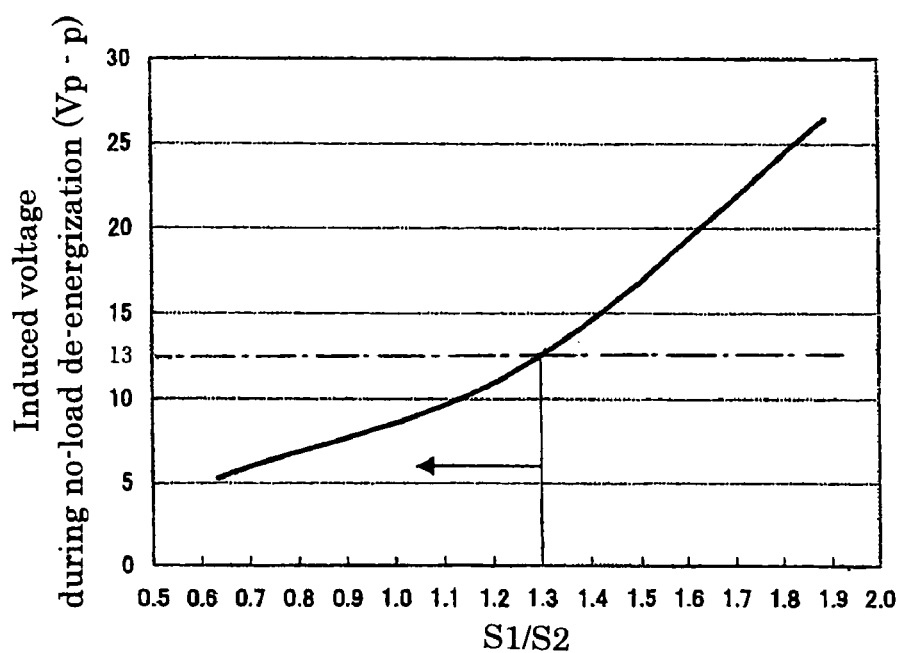
FIG. 16 is a graph that represents a relationship between induced voltage during no-load de-energization and (S1/S2) in the automotive alternator according to Embodiment 5 of the present invention.

Now, induced voltage during no-load de-energization was measured in the configuration of the present invention using (S1/S2) as a parameter, results thereof being shown in FIG. 16.

It can be seen from FIG. 16 that the greater (S1/S2), the greater the induced voltage during no-load de-energization. Vehicle equipment may be damaged if the induced voltage during no-load de-energization exceeds the system voltage. Thus, in the case of a system that has a 12-volt onboard power source, it is necessary to suppress the induced voltage during no-load de-energization to less than or equal to 13V in order to avoid damage to vehicle equipment.

It can be seen from FIG. 16 that the induced voltage during no-load de-energization can be suppressed within a range that does not damage vehicle equipment, and generated current can be increased maximally, by setting (S1/S2) to less than or equal to 1.3.

Thus, according to Embodiment 5, because permanent magnets and claw-shaped magnetic pole portions are prepared so as to satisfy an expression S1/S2≦1.3, where S1 is the area of an upper surface of the permanent magnets that faces the claw-shaped magnetic pole portions, and S2 is the cross-sectional area of the claw-shaped magnetic pole portions in a plane that passes through an axially innermost portion of the upper surface of the permanent magnets and that is perpendicular to a central axis of a shaft, the occurrence of circumstances in which onboard equipment may be damaged can be avoided even if the automotive alternator according to the present configuration is used in a system that has a 12-volt onboard power source.

Moreover, in each of the above embodiments, explanations are given for automotive alternators, but the present invention is not limited to automotive alternators, and similar effects are also exhibited if the present invention is applied to other dynamoelectric machines such as automotive electric motors, automotive generator-motors, etc.

In each of the above embodiments, the first and second permanent magnets 31 and 33 are explained as being disposed so as to be positioned inside a projected region that is obtained by projecting tip end portions of the second and first claw-shaped magnetic pole portions 24 and 20 onto the first and second yoke portions 19 and 23 from radially above, but it is not absolutely necessary for the first and second permanent magnets 31 and 33 to be positioned inside the projected region. For example, the permanent magnets may also be disposed so as to protrude circumferentially from the projected region in question provided that the upper surfaces of the permanent magnets are positioned more radially inward than an external surface of the rotor.

What is claimed is:

1. A dynamoelectric machine comprising:
    a rotor comprising:
        a pole core comprising:
            a boss portion;
            a pair of yoke portions that are disposed so as to extend radially outward from two axial end edge portions of said boss portion; and
            a plurality of claw-shaped magnetic pole portions that are disposed so as to extend in an axial direction alternately from each of said pair of yoke portions, and that are arranged circumferentially so as to intermesh with each other,
            said pole core being fixed to a shaft that is inserted through a central axial position of said boss portion; and
        a field coil that is housed inside a space that is surrounded by said boss portion, said pair of yoke portions, and said plurality of claw-shaped magnetic pole portions;
    a stator that is disposed so as to surround said rotor with a predetermined air gap interposed; and
    a plurality of permanent magnets that are held near said pair of yoke portions so as to face an inner circumferential surface of a tip end portion of each of said plurality of claw-shaped magnetic pole portions, each of said plurality of permanent magnets being magnetically oriented in a reverse direction to an orientation of a magnetic field that said field coil produces.

2. A dynamoelectric machine according to claim 1, wherein a radially outer peripheral surface of each of said plurality of permanent magnets is formed so as to be approximately parallel to an inner circumferential surface of said facing claw-shaped magnetic pole portion.

3. A dynamoelectric machine according to claim 2, wherein a radially inner peripheral surface of each of said plurality of permanent magnets is formed so as to be approximately parallel to the inner circumferential surface of said facing claw-shaped magnetic pole portion.

4. A dynamoelectric machine according to claim 2, wherein a radially inner peripheral surface of each of said plurality of permanent magnets is formed so as to have a surface that is parallel to a central axis of said shaft in an axial direction.

5. A dynamoelectric machine according to claim 1, wherein a direction of magnetization of each of said plurality of permanent magnets is directed at an inner circumferential surface of said facing claw-shaped magnetic pole portion.

6. A dynamoelectric machine according to claim 5, wherein said direction of magnetization of each of said plurality of permanent magnets is perpendicular to said inner circumferential surface of said facing claw-shaped magnetic pole portion.

7. A dynamoelectric machine according to claim 5, wherein said direction of magnetization of each of said plurality of permanent magnets is inclined toward said field coil relative to a line perpendicular to said inner circumferential surface of said facing claw-shaped magnetic pole portion in a cross section that includes a central axis of said shaft.

8. A dynamoelectric machine according to claim 1, wherein a gap between each of said plurality of permanent magnets and an inner wall surface of said facing claw-shaped magnetic pole portion is narrower than said air gap.

9. A dynamoelectric machine according to claim 1, wherein each of said plurality of permanent magnets is positioned inside a projected region that is obtained by projecting said tip end portion of said facing claw-shaped magnetic pole portion onto one of said yoke portions from radially above.

10. A dynamoelectric machine according to claim 1, further comprising:
    a plurality of interfitting recess portions, each of said plurality of interfitting recess portions being disposed so as to extend axially on a respective portion of one of said pair of yoke portions that face one of said plurality of claw-shaped magnetic pole portions, and one of said plurality of permanent magnets being press-fitted into one of said interfitting recess portions from axially outside and held thereby.

11. A dynamoelectric machine according to claim 1, further comprising:
    a plurality of interfitting recess portions, each of said plurality of interfitting recess portions being disposed so as to extend axially on a respective portion of one of said pair of yoke portions that face one of said plurality of claw-shaped magnetic pole portions; and
    a plurality of magnet seats that are made of a magnetic material, each of said plurality of magnet seats being press-fitted into one of said plurality of interfitting recess portions from axially outside and held thereby,
    wherein each of said plurality of permanent magnets is held by each of said plurality of magnet seats.

12. A dynamoelectric machine according to claim 1, wherein:
- each of said plurality of permanent magnets is a sintered rare-earth magnet; and
- each of said plurality of permanent magnets and each of said plurality of claw-shaped magnetic pole portions are prepared so as to satisfy an expression $S1/S2 \leq 1.3$, where S1 is an area of an upper surface of each of said plurality of permanent magnets that faces each of said plurality of claw-shaped magnetic pole portions, and S2 is a cross-sectional area of each of said plurality of claw-shaped magnetic pole portions in a plane that passes through an axially innermost portion of said upper surface of each of said plurality of permanent magnets and that is perpendicular to a central axis of said shaft.

13. A dynamoelectric machine according to claim 1, wherein a gap is provided between each of the plurality of permanent magnets and an inner surface of said facing claw-shaped magnetic pole.

* * * * *